(12) United States Patent
Bizzarro

(10) Patent No.: US 7,584,782 B1
(45) Date of Patent: Sep. 8, 2009

(54) VALVE DEFINING MODULATED AND UNMODULATED FLOW PATHS

(75) Inventor: Peter Bizzarro, Canton, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 498 days.

(21) Appl. No.: 11/511,940

(22) Filed: Aug. 28, 2006

(51) Int. Cl.
*B64D 37/00* (2006.01)
*F16K 11/02* (2006.01)

(52) U.S. Cl. .................. 165/101; 244/135 R; 417/243; 137/861

(58) Field of Classification Search .............. 165/100, 165/101, 103; 244/135 R; 417/243; 137/861
See application file for complete search history.

(56) References Cited

U.S. PATENT DOCUMENTS

| | | | |
|---|---|---|---|
| 4,121,610 A | 10/1978 | Harms et al. | |
| 6,913,636 B2 * | 7/2005 | Defrancesco et al. | 95/8 |
| 6,929,056 B2 * | 8/2005 | Meshenky et al. | 165/47 |
| 7,048,231 B2 * | 5/2006 | Jones | 244/135 R |
| 7,175,692 B2 * | 2/2007 | Schwalm | 95/22 |
| 7,300,494 B2 * | 11/2007 | Schwalm et al. | 95/54 |
| 7,306,644 B2 * | 12/2007 | Leigh et al. | 95/14 |
| 7,306,646 B2 * | 12/2007 | Wong | 95/45 |

* cited by examiner

*Primary Examiner*—John Fox
(74) *Attorney, Agent, or Firm*—Kinney & Lange, P.A.

(57) ABSTRACT

A valve comprises an inlet portion configured to couple to a source of a fluid, and a body portion in fluidic communication with the inlet portion. The body portion defines a modulated flow path and a constant flow path adjacent to the modulated flow path.

13 Claims, 3 Drawing Sheets

VALVE DEFINING MODULATED AND UNMODULATED FLOW PATHS

BACKGROUND

The present invention relates to a valve. More particularly, the present invention relates to a fluidic or air valve defining at least a first flow path with a modulating device such as a disk or flapper and a second, unmodulated flow path.

One method of suppressing fire and explosions in an aircraft fuel tank is to provide a non-explosive atmosphere within the fuel tank by replacing potentially combustible air in a fuel tank ullage (i.e., the space within the fuel tank unoccupied by fuel) with an inerting gas, such as nitrogen-enriched air (NEA). An onboard inerting system is often used to supply NEA (or another inerting gas) into the tank ullage when the demand arises (e.g., in order to increase the pressure inside the ullage in response to changing atmospheric conditions or to otherwise maintain the oxygen content in the ullage at or below a desirable level). The inerting system can typically include a nitrogen generating system (NGS) that separates nitrogen from high pressure air generated by a single compressor, or series of compressors within the system. Ram air (i.e., air from outside the aircraft), independent of the high pressure air circuit, is the heat sink source to cool the hot compressed air generated by the compressors. Both ram air and compressor air flows thru a heat exchanger to exchange heat.

In one type of NGS, ram air is fed to the NGS through a single inlet duct. A component's modulating valve controls flow of ram air to the NGS, such as a plurality of heat exchangers. The NGS output level typically depends on the amount of inert air required to fill the fuel tank ullage to maintain an inert environment. The modulating valve helps to achieve various NGS nitrogen gas output levels by controlling the amount of ram air that is directed to the heat exchangers to cool the heat of compressed air from the compressors. The amount of heat transfer is dependent upon flow thru the compressors to accommodate the NGS desired output.

It has been found that in at least one particular NGS, a dedicated constant flow of ram air is desirable for multiple purposes, such as cooling a compressor motor and/or because at least one of the plurality of heat exchangers requires a constant flow of air. Given the space constraints in many aircraft, it may be undesirable to modify the NGS system to include more than one inlet duct to provide for modulating and constant ram flows to the heat exchanger. As a result, both the constant flow and modulated flow of ram air must be provided through a single inlet duct leading to the valve. There is a need for a valve design that provides multiple out flows, including at least one constant out flow, without requiring substantial modification of current NGS inlet duct dimensions.

BRIEF SUMMARY

The present invention is a valve defining at least two adjacent flow paths, where the fluid flow rate through one flow path is modulated and the fluid flow rate through the other flow path is constant. The two flow paths share one inlet duct.

DETAILED DESCRIPTION

The present invention is a valve defining at least a first modulated or variable flow path and a second, unmodulated or bypass flow path. While the inventive valve is described below in reference to a nitrogen generating system (NGS) for an aircraft, it should be understood that a valve in accordance with the present invention is suitable for any application in which it is desirable to implement a valve with at least two flow paths that share a common inlet portion.

Figure 1:
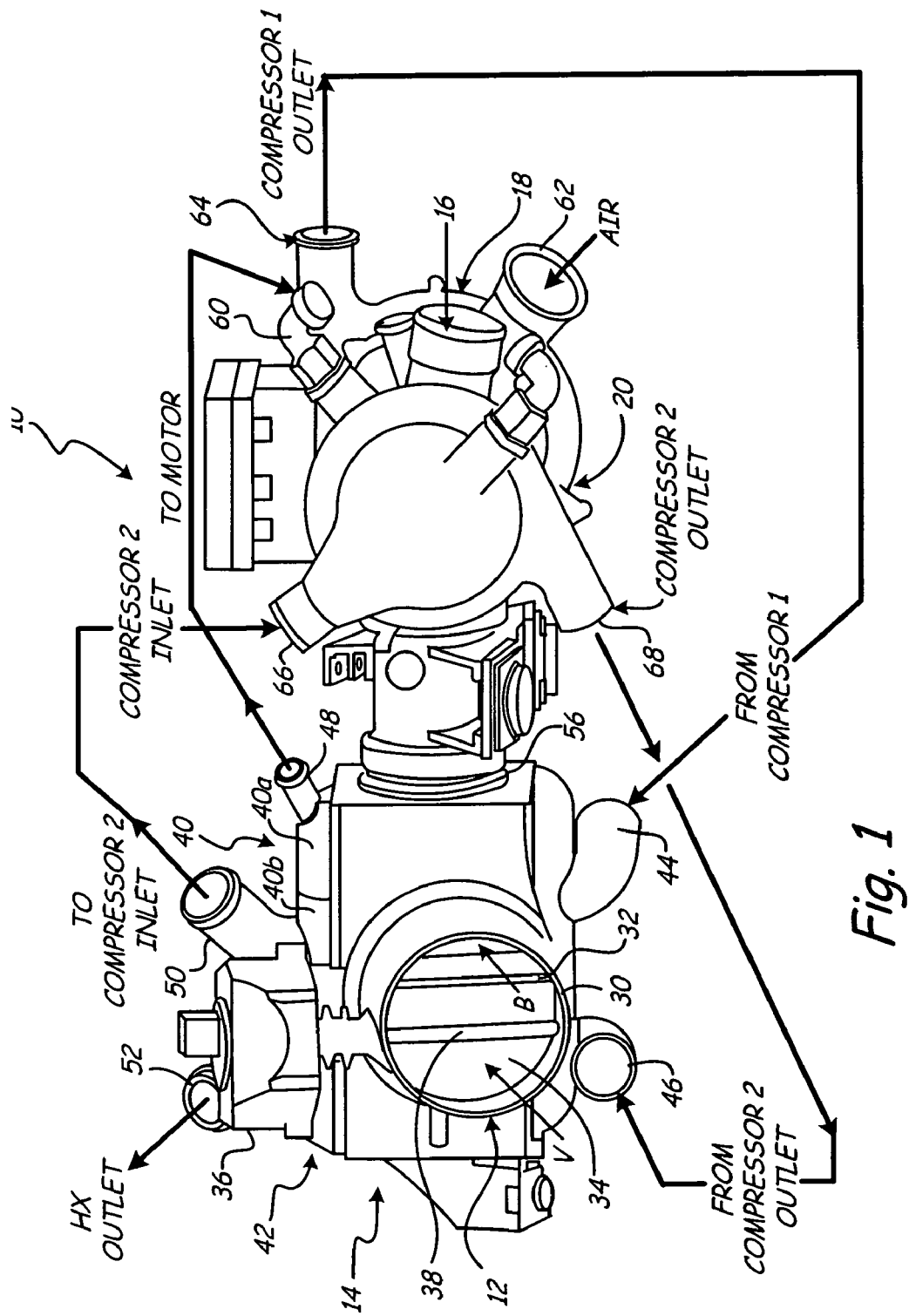
FIG. 1 is a perspective view of a nitrogen generating system, which includes an air inlet valve in accordance with the present invention.

FIG. 1 shows nitrogen generating system (NGS) 10, which includes inlet air valve 12, heat exchanger 14, motor 16, first compressor 18, and second compressor 20. Valve 12 is mounted to the inlet header of heat exchanger 14, and includes valve body 30, baffle 32, modulating valve disk 34, actuator 36, and shaft 38. Valve 12 provides dual flow paths for ram air into heat exchanger 14. Bypass path B is shown to the right of baffle or separator 32, while variable path V (shown to the left of separator 32) has a variable opening controlled by modulating valve disk 34. The position of disk 34, and therefore the flow through variable path V, is controlled by actuator 36, which rotates shaft 38, on which disk 34 is mounted.

As shown in FIG. 1, heat exchanger 14 includes intercooler 40 and main heat exchanger 42. Intercooler 40 is divided into two sections: intercooler section 40a, which is dedicated to cooling motor 16; and intercooler section 40b, which cools air from first compressor 18. Separator 32 is a vertical wall that extends into heat exchanger 14 to separate incoming ram air to intercooler 40. Separator 32 defines a constant flow opening for ram air to flow through section 40a of intercooler 40. The opposite side of separator 32 provides for ram air flow to enter intercooler section 40b through the variable opening of valve 12 controlled by disk 34. The variable flow of ram air also is delivered to main heat exchanger 42, and is used to cool air from second compressor 20. Heat exchanger 14 includes compressor air inlets 44 and 46, air outlet 48, air outlet 50, heat exchanger outlet 52, ram air outlet 54 (shown in FIG. 2), and mount 56.

Motor 16 drives first compressor 18 and second compressor 20. Motor 16 includes air inlet 60 for receiving cooling air from outlet 48 of heat exchanger 14.

First compressor 18 includes inlet 62 and outlet 64. Air from outlet 64 of first compressor 18 is delivered to inlet 44 of heat exchanger 14.

Second compressor 20 includes inlet 66 and outlet 68. As shown in FIG. 1, second compressor inlet 66 receives air from outlet 50 of heat exchanger 14. Air from second compressor outlet 68 is delivered to inlet 46 of heat exchanger 14.

In operation, air is drawn through inlet 62 into first compressor 18. Air flows out of outlet 64 of compressor 18 to inlet 44 of heat exchanger 14. The first compressor air flows through intercooler section 40a to outlet 48, where it is delivered to air inlet 60 of motor 16. The air passing through intercooler section 40a is cooled by ram air which has flowed through the open bypass section of valve 12.

A portion of the air delivered from first compressor 18 to inlet 44 flows through intercooler section 40b to outlet 50, and then is supplied to inlet 66 of second compressor 20. The air flowing through intercooler 40b from first compressor 18 is cooled by a variable flow of ram air that is modulated by disc 34.

Output air from second compressor 20 is delivered through outlet 68 to inlet 46. The second compressor air flows through main heat exchanger 42 to heat exchanger outlet 52.

Figure 2:
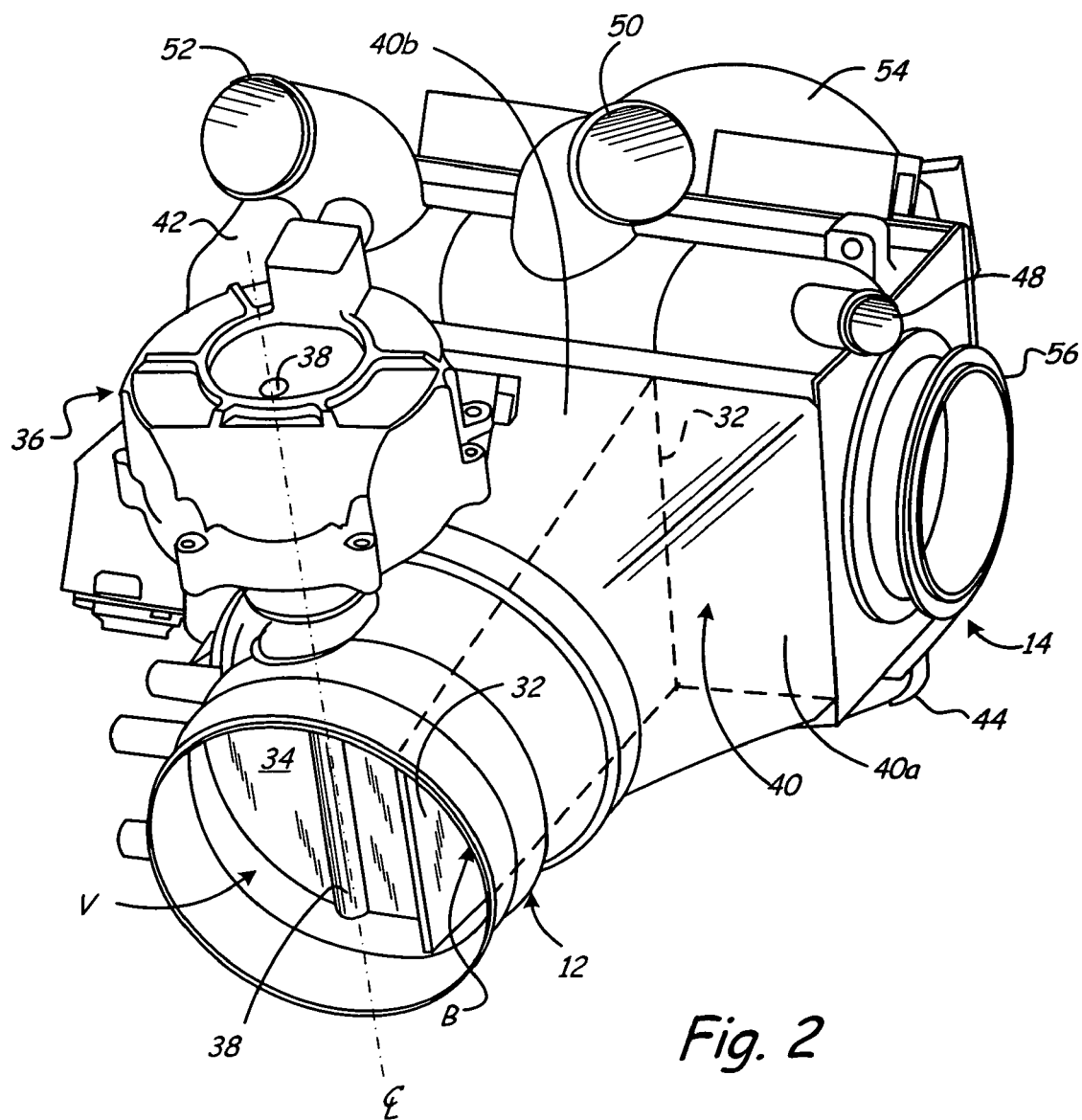
FIG. 2 is a perspective view of the inlet valve and heat exchanger of the system of FIG. 1.

FIG. 2 shows valve 12 and heat exchanger 14 separate from the other components of NGS 10. Valve 12 provides two separate passageways for ram air: unmodulated or bypass passage B and modulated or variable passage V. Bypass passage B allows a portion of ram air received at the inlet end of valve 12 to pass directly to intercooler 40a.

Figure 3:
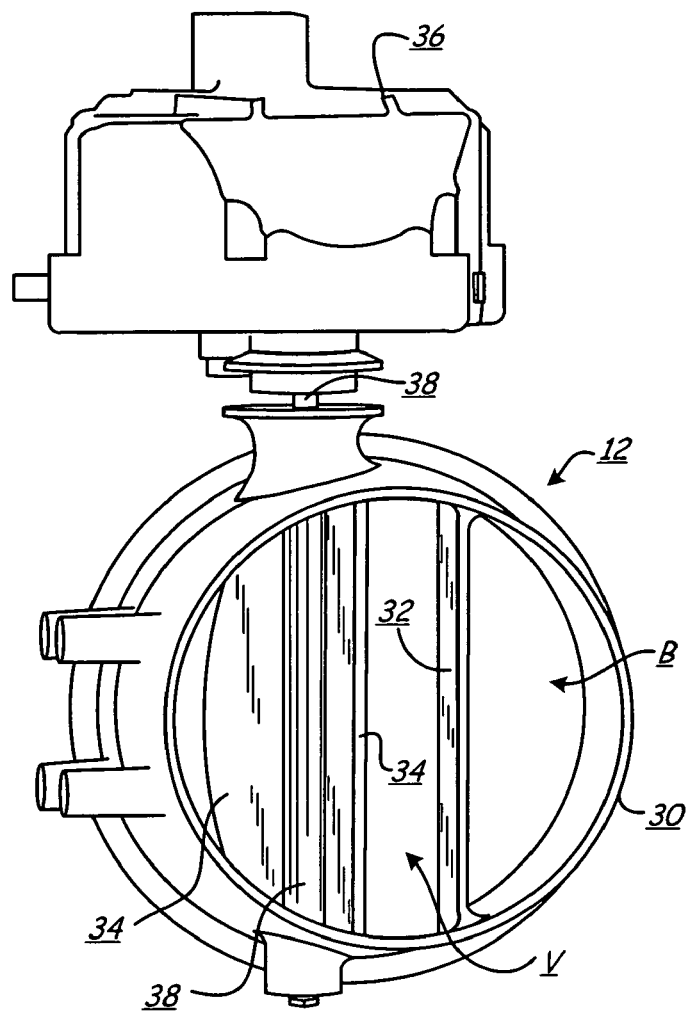
FIG. 3 is a perspective view of the air inlet valve of FIG. 1 and with the valve modulating disk in an open position.

Variable flow passage V controls the flow of air to intercooler 40b and main heat exchanger 42. The amount of air flowing through passage V is controlled by the position of disc 34. Actuator 36 rotates shaft 38 to position disc 34 in passage V. Disc 34, in combination with actuator 36 and shaft 38, operates as a butterfly valve assembly, which rotates around centerline CL of shaft 38. In FIG. 2, disc 34 is shown in a closed position, thereby blocking airflow through passage V. In FIG. 3, disc 34 is shown in an open position, so that a portion of the ram air delivered to valve 12 can pass through passage V to intercooler section 40b and main heat exchanger 42.

Figure 4:
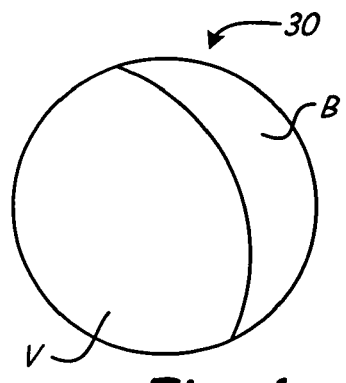
FIG. 4 shows an embodiment with a curved separator.

Valve 12 provides multiple flow paths that share a single inlet. Bypass passage B provides a constant airflow, while variable passage V provides a variable airflow, depending upon the position of valve disc 34. Although both passage B and V are shown as having a D-shaped opening, other shapes can also be used. For example, FIG. 4 shows an embodiment in which separator 32 is curved and bypass passage B is crescent shaped. Similarly, although the butterfly-type valve is shown in variable passage V, other types of flow modulating valves may be positioned within passage V. Examples include a ball valve, a gate valve, a spool valve, and a flapper valve.

Although inlet valve 12 is described as being used to introduce ram air into NGS 10, it should be understood that an inlet valve in accordance with the principles of the present invention may be used in conjunction with other fluids, such as liquids, as well as other assemblies. Furthermore, the inlet valve may be formed of any suitable material, such as, but not limited to, metals, polyvinyl chloride, and other plastic materials.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A nitrogen generating system for an aircraft, the nitrogen generating system comprising:

a heat exchanger including a first section and a second section; and
an inlet valve fluidically connected to the heat exchanger and configured to receive a flow of air, wherein inlet valve comprises:
a first flow path configured to provide a constant flow of air to the first section of the heat exchanger; and
a second flow path configured to provide a variable flow of air to the second section of the heat exchanger.

2. The nitrogen generating system of claim 1, wherein the inlet valve comprises:
a modulating valve disposed within the second flow path for varying the flow of air through the second flow path.

3. The nitrogen generating system of claim 2, wherein the modulating valve is selected from a group consisting of a butterfly valve, a gate valve; spool valve, a flapper valve, and a ball valve.

4. The nitrogen generating system of claim 1, wherein the heat exchanger includes a main heat exchanger and an intercooler having a first intercooler section and a second intercooler section, wherein the first section of the heat exchanger includes the first intercooler section, and wherein the second section of the heat exchanger includes the second intercooler section and the main heat exchanger.

5. The nitrogen generating system of claim 4 and further comprising:
a first compressor having an outlet connected to an inlet of the intercooler;
a second compressor having an inlet connected to an outlet of the second intercooler section, and having an outlet connected to an inlet of the main heat exchanger; and
a motor for driving the first and second compressors and having an air inlet connected to an outlet of the first intercooler section.

6. The nitrogen generating system of claim 1 and further comprising a separator positioned between the second flow path and the first flow path.

7. The nitrogen generating system of claim 6 and further comprising a butterfly valve positioned in the second flow path.

8. The nitrogen generating system of claim 6, wherein the separator comprises a vertical wall.

9. The nitrogen generating system of claim 6, wherein the separator comprises a curved wall.

10. The nitrogen generating system of claim 1, wherein the first flow path has a D-shaped opening.

11. The nitrogen generating system of claim 1, wherein the first flow path has a crescent shaped opening.

12. The nitrogen generating system of claim 1, wherein the inlet valve comprises an inlet portion for receiving the flow of air, and a body portion in communication with the inlet portion and secluding the first and second flow paths.

13. The nitrogen generating system of claim 12, wherein the inlet portion and the body portion each have a constant diameter.

* * * * *